United States Patent Office 3,737,516
Patented June 5, 1973

3,737,516
CALCIUM-DEFICIENT HYDROXYLAPATITE FOR USE IN COLUMN CHROMATOGRAPHY
Edward L. Jenner, Wilmington, Del., assignor to E. I. du Pont de Nemours and Company, Wilmington, Del.
Filed Mar. 5, 1971, Ser. No. 121,504
Int. Cl. C01b 15/16, 25/26
U.S. Cl. 423—308         9 Claims

ABSTRACT OF THE DISCLOSURE

Disclosed herein is granular calcium-deficient hydroxylapatite having a formula weight ratio of $Ca/PO_4$ of between about 1.40 to 1.50, useful as a protein adsorption medium in column chromatography. Also disclosed is a one-step process comprising contacting under controlled conditions at least one of calcium chloride, nitrate or acetate with a mixture of secondary and tertiary orthophosphate salts in which the cation is selected from at least one of $Na^+$, $K^+$, and $NH_4^+$.

BACKGROUND OF THE INVENTION (1) Field of the invention

This invention relates to a novel process for making calcium-deficient hydroxylapatite, to the granular hydroxylapatite made thereby and to its use in column chromatography.

(2) Description of the prior art

The exact nature of the hydroxylapatite form of calcium phosphate depends upon many factors such as concentration and identity of the particular reactants employed, the method of admixing, the time of contact, the reaction temperature, the pH of the reaction slurry, the manner of washing the precipitate, and the temperature of digestion.

Some of the results of attempts made to synthesize hydroxylapatite, the principal mineral constituent of bone, are summarized in articles by S. Eisenberger, et al., Chem. Rev. 26, 257 (1940) and W. F. Neuman et al., Chem. Rev. 53, 1 (1953).

J. A. S. Bett et al., J. Am. Chem. Soc., 89, 5535 (1967), report that calcium-deficient hydroxylapatites are of great biological interest because the $Ca/PO_4$ ratio in bone is nearer to 1.5 than to the theoretical 1.67 required for stoichiometric hydroxylapatite, $Ca_{10}(PO_4)_6(OH)_2$.

To adsorb proteins on calcium phosphate gel was known by early investigators who employed the gel rather unsuccessfully in batch adsorption and elution experiments. The gel did not permit liquid to percolate through it at a useful rate, hence it was necessary to mix it with diatomaceous earth for use in an adsorption column. This was not a satisfactory procedure, and A. Tiselius, et al., Arch. Biochem. Biophys. 65, 132–155 (1956), developed a technique for preparing hydroxylapatite suitable for use in a column.

They first prepared the brushite form of calcium phosphate, $CaHPO_4 \cdot 2H_2O$, by mixing calcium chloride and sodium monohydrogen phosphate. This precipitate was washed four times by decantation and then boiled with sodium hydroxide for an hour. It was again washed four times by decantation, heated with sodium phosphate solution, and the liquid decanted. This was followed by four separate treatments with boiling sodium phosphate solution. Thus, besides the many washings, the original calcium phosphate was given six separate treatments with hot aqueous alkali. The Tiselius et al. procedure is described in more detail in "Biochemical Preparations," M. J. Coon, ed., John Wiley and Sons, Inc., New York, 1962, pp. 83–85.

A variation of the procedure is described by R. K. Main et al., J. Am. Chem. Soc. 81, 6490–95 (1959) who prepared brushite and then treated it with boiling aqueous calcium hydroxide solution. This procedure is not practical on a large scale because of the large volumes of calcium hydroxide solution required to convert precipitated brushite to hydroxylapatite.

Brushite, $CaHPO_4 \cdot 2H_2O$, is not satisfactory as a protein adsorbent because of its instability. It decomposes in aqueous systems, liberating phosphoric acid, and forming a basic calcium phosphate. This could happen during chromatographic separations, resulting in complications. The Main et al. article states that brushite decomposes on storage even at room temperature in tightly capped bottles, changing to anhydrous calcium phosphate.

SUMMARY OF THE INVENTION

The new granular-chromatographic grade of calcium-deficient, hydroxylapatite-related calcium phosphate is characterized, inter alia, by (1) a $Ca/PO_4$ formula weight ratio of about $1.45 \pm 0.05$, (2) an X-ray powder pattern of calcium-deficient hydroxylapatite free of diffraction peaks due to $CaHPO_4 \cdot 2H_2O$ and in which diffraction peaks arising from ($hkl$) planes are sharp when $h$ and $k$ are zero and broadened when $l$ is small compared to $h$ and $k$, (3) a capability of adsorbing, at about 0° C., proteins such as ovalbumin from neutral, dilute phosphate buffer solution to the extent that the solution in equilibrium with one milligram of adsorbed protein (ovalbumin) per gram of the calcium phosphate contains 0.02–0.1 mg. of protein (ovalbumin) per ml. of 0.01 molar phosphate solution, and (4) said calcium phosphate permitting a flow, at about 25° C., of 1 to 3.5 ml./minute of 0.005 M phosphate buffer solution under 200 mm. head pressure through a 32 mm. diameter bed of the calcium phosphate packed in a column to a depth of 50 mm.

The novel process comprises contacting
(A) A calcium salt selected from at least one member of the group consisting of calcium chloride, calcium nitrate and calcium acetate with (B) a mixture of secondary and tertiary orthophosphate salts the metal cations of which are selected from at least one of the group consisting of sodium, potassium and ammonium, under aqueous conditions and substantially constant precipitation environment conditions, at temperatures between about 35° to 55° C. and at a pH of between about 5.5 to 7.5.

To achieve constant environment conditions, which achievement is important to make a repeatedly uniform product, the calcium salt and mixed orthophosphate salts are added substantially simultaneously at nearly constant rates of feed to an aqueous solution maintained at the desired pH of 5.5 to 7.5. In addition, the aqueous solution contains the salt(s) formed by combination of the anion(s) originally associated with the calcium salts(s) and the cation(s) originally associated with the orthophosphate salts(s) at a total molarity approximately numerically equal to that of the calcium salt in the calcium salt feed.

For best results, the aqueous solution to which the feed streams are added will contain seed crystals of pre-prepared calcium-deficient hydroxylapatite in which the $Ca/PO_4$ formula weight ratio is $1.45\pm0.05$. The seed crystals may be present in amounts of about 2 grams for each mole of calcium salt in the calcium salt feed.

The description "calcium-deficient hydroxylapatite" is a term of art employed with regard to calcium phosphates wherein the ratio of $Ca/PO_4$ is less than 1.67. The value 1.67 is the theoretical ratio in hydroxylapatite for which the formula may be written as $Ca_{10}(PO_4)_6(OH)_2$.

Based on the formula for the theoretical hydroxylapatite written above, a formula for the calcium-deficient hydroxylapatite described herein may be written empirically as $Ca_{8.7}H_{2.6}(PO_4)_6(OH)_2$ or

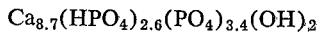

$$Ca_{8.7}(HPO_4)_{2.6}(PO_4)_{3.4}(OH)_2$$

It is to be understood that the bases for writing the formula in these ways are (1) the relationship of the X-ray diffraction pattern to that commonly accepted for hydroxylapatite and (2) the 8.7 to 6, i.e., 1.45 to 1, ratio of Ca to $PO_4$. It is preferred, however, not to be bound to any hypothesized formula in describing the novel products but to be bound to a ratio of $Ca/PO_4$ together with the other identifying characteristics defined herein.

By "constant environment conditions" is meant conditions under which the composition of the medium in which precipitation is effected remains essentially constant as the reactants are added and precipitation takes place.

Hereafter the designation "solution A" or "feed stream A" will be used in describing the aqueous calcium salt solution; "solution B" or "feed stream B" will be used to describe the aqueous mixture of secondary and tertiary phosphates; and "solution C" will be used to designate the aqueous solution (or slurry) to which feed streams A and B are added.

DETAILS OF THE INVENTION

Two of the most characteristic methods of defining the novel calcium-deficient hydroxylapatite compositions of this invention are $Ca/PO_4$ formula weight ratio and X-ray diffraction pattern.

As has been explained, the $Ca/PO_4$ formula weight ratio in the novel products is between about 1.40 to 1.50. To make such products, it has been found necessary, inter alia, to carefully control the formula weight ratios of the calcium salts to the phosphates, contained in the feed streams, during the process of the reaction.

Figure 3:
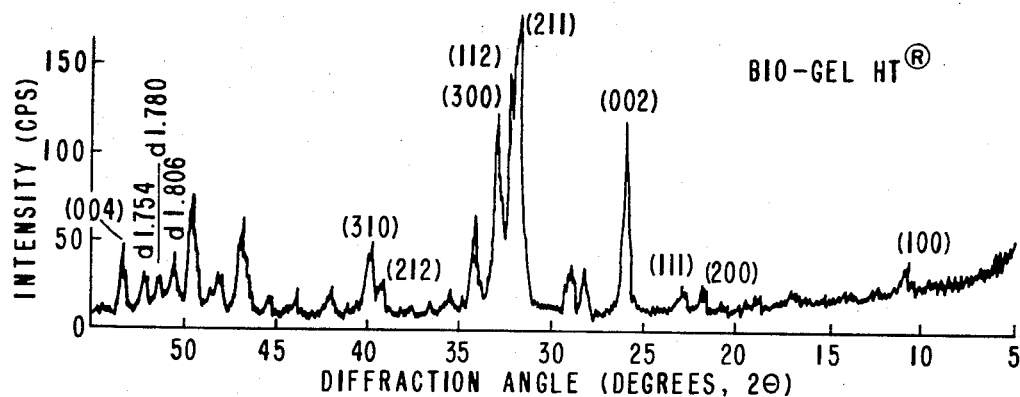
FIGS. 3 and 4 are X-ray diffraction patterns of two commercially available hydroxylapatite-type calcium phosphates.
Figure 4:
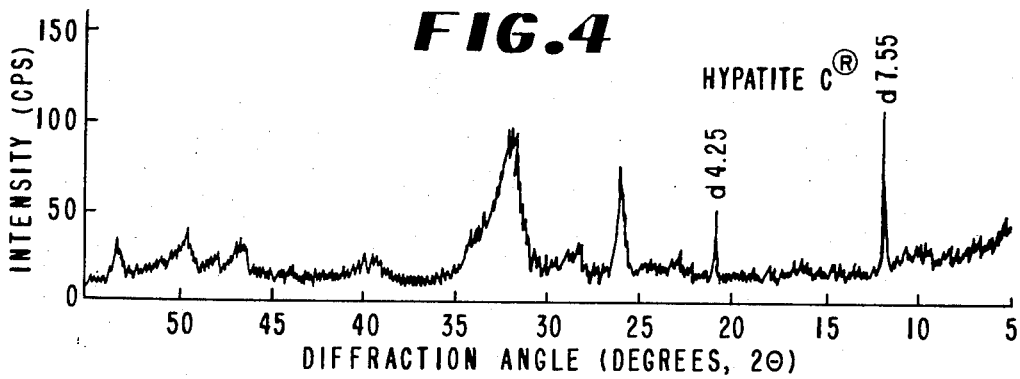
Figure 5:
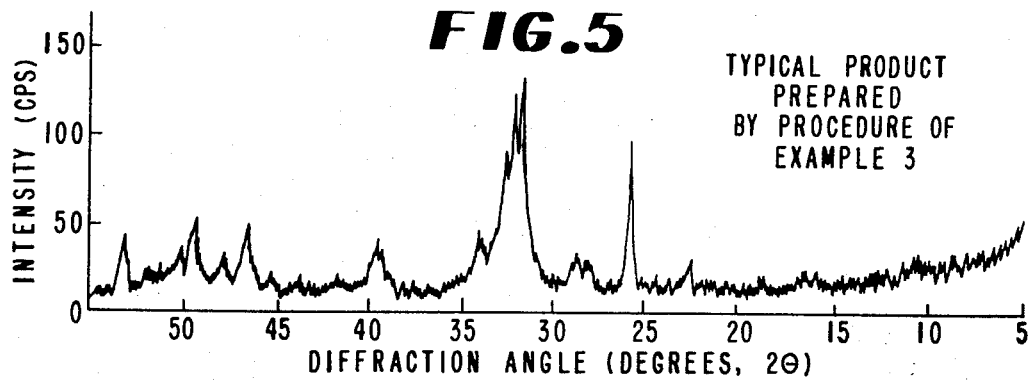
FIG. 5 is an X-ray diffraction pattern of the novel product of this invention made by the procedure of Example 3.

The X-ray powder diffraction pattern of the calcium-deficient hydroxyapatite of this invention is distinctly different, as may be seen from Table I and by comparing FIGS. 3 4 and 5, from that reported in the ASTM standard powder data file for hydroxylapatite and from patterns determined for Bio-Gel HT ® and Hypatite C®. The novel calcium-deficient hydroxylapatite gives X-ray diffraction patterns in which reflections due to $CaHPO_4 \cdot 2H_2O$ are not observed and in which reflections arising from $(hkl)$ planes are sharp when $h$ and $k$ are zero and broadened when $l$ is small compared to $h$ and $k$. That is, sharp, strong reflections arise from the basal planes, e.g. (002) and (004), but weak, broad reflections arise from the prism faces, e.g., (200), (300) and (310).

It is clear from a comparison of FIGS. 3 and 5 that the diffraction pattern of the product of the invention is less well resolved with fewer sharp lines than that of Bio-Gel HT®. This is especially evident from the three peaks at $d$ values of 1.754, 1.780 and 1.806 A. in the Bio-Gel HT® pattern, FIG. 3 (hydroxylapatite also diffracts at the same $d$ values) as contrasted to scattering in this same region in the pattern of the Ca-deficient hydroxylapatite, FIG. 5.

The (200) and (111) planes of both hydroxylapatite and Bio-Gel HT® diffract with approximately equal intensity at $d$ values of 4.07 A. and 3.88 A., respectively. (See Table I.) The (200) reflection cannot be observed in the pattern of the product of this invention, whereas the adjacent (111) reflection is present and of the expected intensity.

The three strongest reflections of hydroxylapatite occur at $d$ values of 2.814 A., 2.778 A. and 2.720 A., originating from the (211), (112), and the (300) planes. In Bio-Gel HT® the (211) reflection is the most intense, the nearby (112) reflection is of lower intensity, and the (300) reflection is separate and sharp. In the product of the invention, the (211) and the (112) reflections are of approximately equal intensity, forming a doublet, and the (300) reflection is a poorly resolved shoulder on the (112) peak.

As can be seen from FIG. 3, Bio-Gel HT® has a sharp (310) plane reflection. This reflection occurs at a $d$ value of approximately 2.26 A. In contrast, it is seen from FIG. 5 that the novel composition exhibits a broad (310) plane reflection. Furthermore, this reflection is broadened in the direction of the higher $d$ value, 2.30 A. It is at this higher $d$ value of 2.30 A. where the reflection originating from the (212) plane is evident in FIG. 3.

The X-ray pattern of the novel product of the invention differs, inter alia, from that of Hypatite C® in the absence of fairly strong lines at $d$ values of 7.55 A. and 4.25 A. associated with the presence of $CaHPO_4 2H_2O$ (see Table II). Further, Hypatite C® has a $Ca/PO_4$ ratio of only about 1.3.

X-ray data in Table I for pure hydroxylapatite, which has a hexagonal space lattice, were obtained from Card 9–432 of the American Society of Testing Materials. Based on the data in Table I, it can be seen that the X-ray diffraction pattern of hydroxylapatite corresponds closely with the pattern of Bio-Gel HT®, shown in FIG. 3. The diffraction patterns of FIGS. 3, 4 and 5 and data in Table I for Bio-Gel HT®, Hypatite C®, and the product of this invention were obtained using samples air-dried at room temperature and a Norelco Diffractometer. Relative intensity of the reflections were estimated from peak heights.

TABLE I.—X-RAY DIFFRACTION DATA FOR HYDROXYLAPATITE AND RELATED MATERIALS (The "d" values are the Interplanar Spacings in A., and the "I" values are the Relative Intensities of the reflections)

| Miller Index (hkl) | Hydroxylapatite [1] d | I | Product of the invention [2] d | I | Hypatite C® d | I | Bio-Gel HT® d | I |
|---|---|---|---|---|---|---|---|---|
| 100 | 8.17 | 11 | 8.43 | 8 | 8.50 | 7 | 8.30 | 8 |
|  |  |  |  |  | 7.55 | 100 |  |  |
|  |  |  |  |  | 5.52 | 8 |  |  |
| 101 | 5.26 | 6 | 5.35 | 7 |  |  | 5.28 | 3 |
| 110 | 4.72 | 3 | 4.72 | 6 |  |  | 4.70 | 4 |
|  |  |  |  |  |  |  | 4.55 | 2 |
|  |  |  |  |  | 4.25 | 45 |  |  |
| 200 | 4.07 | 9 |  |  |  |  | 4.08 | 7 |
| 111 | 3.88 | 9 | 3.90 | 13 | 3.88 | 9 | 3.88 | 8 |
|  |  |  | 3.72 | 4 | 3.65 | 5 |  |  |
| 002 | 3.44 | 40 | 3.43 | 69 | 3.42 | 70 | 3.437 | 60 |
| 102 | 3.17 | 11 | 3.16 | 11 | 3.16 | 15 | 3.17 | 13 |
| 210 | 3.08 | 17 | 3.10 | 15 | 3.10 | 13 | 3.09 | 15 |
|  |  |  |  |  | 3.04 | 8 |  |  |
|  |  |  |  |  | 2.92 | 10 |  |  |
| 211 | 2.814 | 100 | 2.82 | 100 | 2.81 | 84 | 2.815 | 100 |
| 112 | 2.778 | 60 | 2.772 | 94 | 2.773 | 84 | 2.78 | 78 |
| 300 | 2.720 | 60 | 2.742 | 67 | 2.74 | 60 | 2.725 | 66 |
| 202 | 2.631 | 25 | 2.63 | 28 | 2.65 | 22 | 2.633 | 33 |
| 301 | 2.528 | 5 | 2.54 | 4 |  |  | 2.53 | 5 |
| 212 | 2.296 | 7 | 2.31 | 10 | 2.285 | 12 | 2.30 | 9 |
| 310 | 2.262 | 20 | 2.27 | 25 | 2.26 | 11 | 2.265 | 21 |
| 221 | 2.228 | 1 | 2.20 | 2 |  |  |  |  |
| 311 | 2.148 | 9 | 2.153 | 7 | 2.17 | 5 | 2.150 | 7 |
| 302 | 2.134 | 3 |  |  | 2.13 | 5 |  |  |
| 113 | 2.065 | 7 | 2.06 | 6 | 2.06 | 5 | 2.065 | 6 |
| 203 | 2.000 | 5 | 2.00 | 8 | 1.992 | 5 | 2.00 | 6 |
| 222 | 1.943 | 30 | 1.948 | 28 | 1.956 | 20 | 1.944 | 30 |
| 312 | 1.890 | 15 | 1.895 | 15 | 1.895 | 12 | 1.892 | 12 |
| 213 | 1.841 | 40 | 1.840 | 30 |  |  | 1.840 | 37 |
|  |  |  | 1.814 | 13 | 1.838 | 28 |  |  |
| 321 | 1.806 | 20 |  |  | 1.79 | 5 | 1.806 | 16 |
| 410 | 1.780 | 11 |  |  | 1.773 | 9 | 1.780 | 10 |
| 402 | 1.754 | 15 |  |  | 1.752 | 8 | 1.755 | 12 |
| 004 | 1.722 | 20 | 1.716 | 23 | 1.715 | 20 | 1.719 | 22 |

[1] From ASTM standard powder data file (Card No. 9-432).
[2] Typical product produced by the procedure of Example 3.

Table II shows the X-ray diffraction pattern for $$CaHPO_4 \cdot 2H_2O$$

which is present in Hypatite C®.

TABLE II

X-ray diffraction pattern for $CaHPO_4 \cdot 2H_2O$ (ASTM standard powder data file—card No. 9-77)

| Spacing, A., d | Relative intensity, I |
|---|---|
| 7.57 | 100 |
| 4.24 | 100 |
| 3.05 | 75 |
| 2.928 | 50 |
| 1.819 | 20 |

It has been found that a formula weight ratio of total Ca introduced via solution A to total PO₄ introduced via solution B, i.e., Ca/PO₄, should be between about 1.20 to 1.44. It is preferred that the ratio be between 1.24 to 1.40. It should be noted that "formula weights of PO₄" refers to total PO₄ whether present as secondary or tertiary orthophosphate.

The concentration of the reactant solution is normally kept reasonably high to reduce the solution volumes that must be handled. For instance, it is preferred to use 1.2±0.3 M calcium salt and $HPO_4^{2-}/PO_4^{3-}$ solution that is 0.9±0.15 M in total PO₄. The solubility of the requisite phosphates in water is the only limit on the maximum concentrations that may be employed.

The rate of reactant addition is not critical but it is important that the ratio of Ca to PO₄ be maintained substantially constant throughout the precipitation procedure. The concentration of either the calcium salt or the phosphate solution may be varied widely though it is preferred to add equal volumes of the reactant solutions at substantially the same rates, by the use of metering pumps, for instance. Normally Ca is precipitated at the rate of approximately 15 millimoles per minute per liter of reaction mixture but the rate may be varied from about 1 to about 20 millimoles per minute per liter of reaction mixture.

Figure 1:
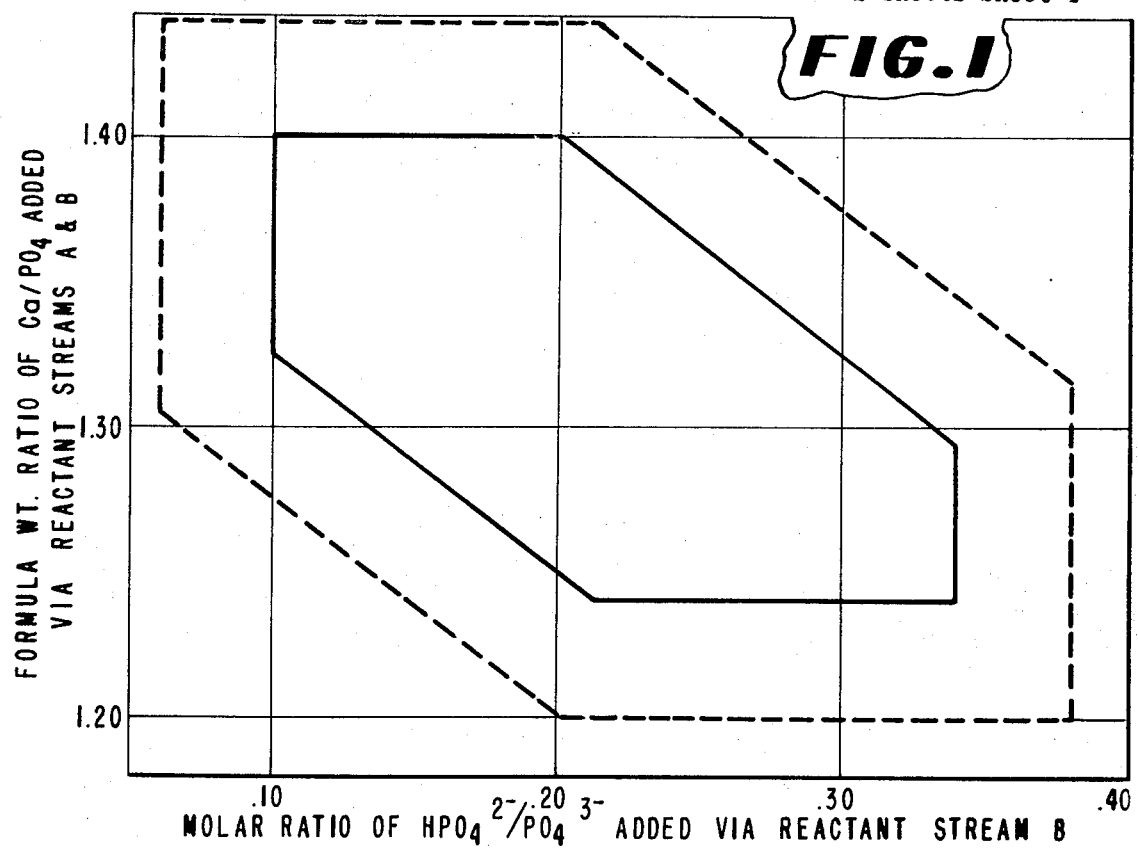
FIG. 1 represents the operable (in broken lines) and the preferred (in solid lines) relationship between the formula weight ratio of $Ca/PO_4$ added via reactant streams A and B, and the molar ratio of $HPO_4^{2-}/PO_4^{3-}$ added via reactant stream B.
Figure 2:
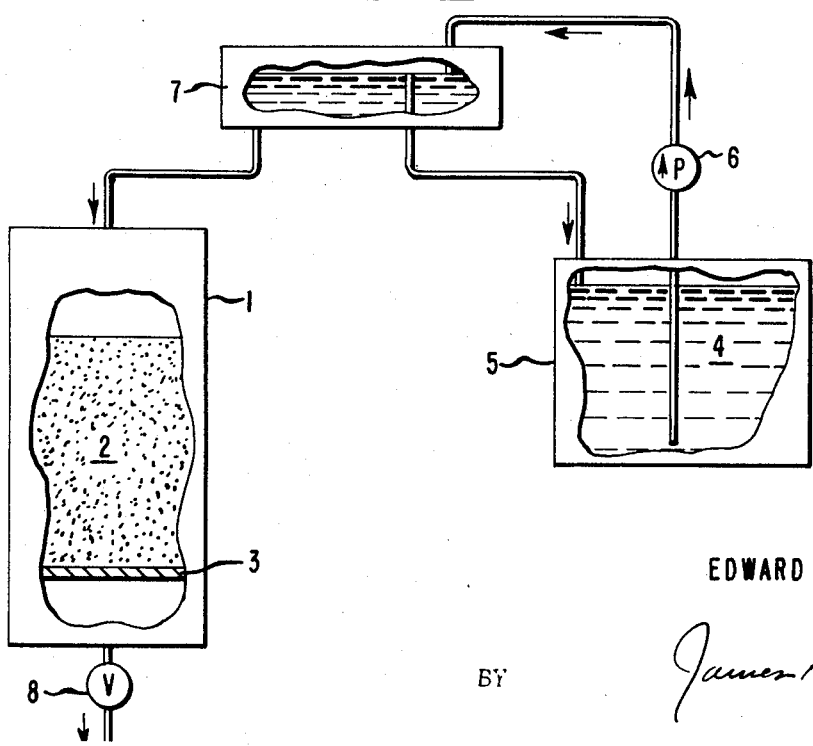
FIG. 2 depicts a typical chromatography column, 1, containing the novel, protein-adsorbent, calcium-deficient hydroxylapatite of this invention. In the depiction, the granular hydroxylapatite, 2, is supported on a liquid permeable device, 3. The protein-containing solution from which the protein is to be adsorbed is charged into the column. Thereafter, phosphate buffer(s), 4, useful for elution of the adsorbed protein from the novel hydroxylapatite adsorbent is pumped from reservoir, 5, by pump, 6, into an optional constant level device, 7, from which it is fed into the column. As the protein is eluted, elution fractions are collected at valve, 8.

The ratio of moles of secondary phosphate to moles of tertiary phosphate ($HPO_4^{2-}/PO_4^{3-}$) in solution B is critically important. Preferbaly this phosphate ratio is in the range 0.10 to 0.34 though ratios of 0.06 to 0.38 are operable. When the phosphate ratio is high, results are best when the Ca/PO₄ formula weight ratio in the reactant streams is low. When the phosphate ratio is low, results are best when the Ca/PO₄ ratio is high. As a result of many experiments, the preferred operating region has been found to fall within the solid lines of FIG. 1, and the operable operating region within the dotted lines. It may be seen from FIG. 1 that the sum $$\frac{Ca}{PO_4} + \left(\frac{3}{4}\right)\left(\frac{HPO_4^{2-}}{PO_4^{3-}}\right)$$

falls within the values of 1.40 and 1.55 for the preferred operating range and within the values of 1.35 and 1.60 for the operable operating range.

The broad 0.06–0.38 phosphate ratio required in solution B may be attained by simply adding otrophosphoric acid to aqueous Na₃PO₄ or K₃PO₄ or by admixing anhydrous or hydrated secondary and tertiary orthophosphate salts before or after dissolving them in water.

The total concentration of phosphate ($PO_4$) in solution in the slurry in which precipitation is effected is important and should be within the range 0.005–0.03 M, preferably about 0.01–0.02 M.

It may not be possible to calculate the actual $HPO_4^{2-}/PO_4^{3-}$ ratio precisely from the weights of tertiary phopshate salt and $H_3PO_4$ or secondary and tertiary phosphate salts actually used since, as pointed out by B. Wendrow et al., Chemical Reviews 54, 892 (1954), both commercial and reagent-grade trisodium phosphate dodecahydrate contain significant quantities of free sodium hydroxide. The $PO_4^{3-}$ and $HPO_4^{2-}$ contents of the solutions described herein were routinely determined by titration with 0.1 N HCl. Such solutions usually had a pH of about 11. The quantity of acid required to give the first point of inflection at about pH 9.2 corresponded to the equivalents of tertiary phosphate ($PO_4^{3-}$) present. The second point of inflection (at pH of about 4.8) corresponded to conversion of all phosphate to $H_2PO_4^-$, i.e., the additional quantity of acid required to go to the second inflection point corresponded to the total equivalents of phosphates initially present in the solution. The difference between the total phosphates and the tertiary phosphate gives the equivalents of $HPO_4^{2-}$ present initially. Presence of sodium hydroxide can be disregarded since both NaOH and $N_2HPO_4$ cannot be present in the same solution.

Reaction temperatures are usually maintained at about 45°±5° C. with preferred temperatures of 45°±1° C. Temperatures slightly below 40° C. and slightly above 50° C. may be operable but the products are less effective protein adsorbers. It has been found that material precipitated at 25° C. contains undesirably large quantities of brushite, $CaHPO_4 \cdot 2H_2O$.

The pH during reaction is important. The pH may be between 5.5 and 7.5 but it is preferred that it be between 6.0 and 7.0. Products prepared at a pH above about 7.5 may settle very slowly and be difficult to process and may, additionally, have relatively poor percolation properties. As the pH drops below about 5.5, the crystalline species detectable by X-ray diffraction changes from hydroxylapatite to the less stable octacalcium phosphate, $Ca_4H(PO_4)_3$.

Since the quantity and concentration of solutions A and B are adjusted to maintain the specified equivalence in $Ca/PO_4$ ratio, pH, etc., the quantity of phosphate-buffered salt solution (which may be seeded) placed in the reactor before the start of addition of solutions A and B is not critical except that its volume should be adequate to permit stirring. The by-product salt molarity of the solution should approximate that of the calcium salt in solution A, that is, be in the range 1.2±0.3 M. The pH of the slurry is adjusted to between 5.5 to 7.5, and preferably to between 6 and 7, in known manner with small quantities of, preferably, alkali metal orthophosphates, e.g., $Na_2PO_4 + K_2HPO_4$ or

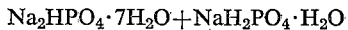

$Na_2HPO_4 \cdot 7H_2O + NaH_2PO_4 \cdot H_2O$

The solution can be seeded with calcium-deficient hydroxylapatite in which the $Ca/PO_4$ molar ratio is 1.45±0.05. The quantity of seed crystals is not highly critical, and about 2 grams for each mole of calcium salt subsequently added as solution A are convenient for use.

While calcium chloride is the preferred source of $Ca^{2+}$ and $Na^+$ is the preferred cation associated with the $HPO_4^{2-}$ and $PO_4^{3-}$ used in the processes of this invention, other calcium salts such as hydrated or anhydrous calcium nitrate or calcium acetate, may be substituted for calcium chloride, and potassium or ammonium orthophosphate salts may be substituted for sodium orthophosphates. Complete substitution of $K_2HPO_4$ and $K_3PO_4$ for the corresponding sodium salts resulted in calcium phosphate somewhat deficient in percolation characteristics.

It is to be understood that the process of this invention can be operated in a continuous manner as well as in batchwise manner. Continuous operation simply requires removal of product slurry at the rate at which it is formed always maintaining suufficient product slurry in the reactor to permit seeding and stirring.

EMBODIMENTS OF THE INVENTION

There follow some nonlimting examples illustrative of the invention.

Example 1

A glass reaction vessel was charged with 48 ml. of 1.5 M sodium chloride and 2 ml. of buffer solution made from 15 ml. of 0.5 M $NaH_2PO_4$ and 85 ml. of 0.5 M $K_2HPO_4$. The resulting solution, which had a pH of about 7, was 1.44 M in NaCl. Calcium-deficient hydroxylapatite (0.23 g.; about 2 g. per mole of $CaCl_2$ used) with $Ca/PO_4$ molar ratio of 1.45±0.05 was added to serve as seed crystals, and the mixture, slurry C, was stirred at 45° C. Eighty mls. each of solutions A and B were added simultaneously at the same rate over a 1 hour period. Solution A was 1.36 M $CaCl_2$ and solution B, prepared by adding 85% orthophosphoric acid to trisodium phosphate solution, was 0.844 M in $Na_3PO_4$, trisodium phosphate, and 0.170 M in $Na_2HPO_4$, disodium hydrogen phosphate. The precipitate settled rapidly to one-third the volume of the slurry one minute after cessation of stirring. The slurry had a final pH of 6.7, and the novel hydroxylapatite-related material was the only crystalline component detected by X-ray diffraction. Analysis of the crystalline product of a similar experiment showed that the ratio of atoms of Ca to formula weights of $PO_4$ was 1.485.

Assuming complete reaction of $CaCl_2$, the final product slurry was 1.36 M in NaCl. The phosphate-buffered NaCl solution originally placed in the reactor was 0.02 M in total $PO_4$ and 1.44 M in NaCl. After precipitation the liquid phas wase found to be 0.011 M in total phosphate ($PO_4$). Obviously, approximately constant ionic strength was maintained throughout the precipitation since by far the major fraction of the ionic strength was due to NaCl and not to dissolved phosphate. The ratio of moles of $HPO_4^{2-}$ to moles of $PO_4^{3-}$ in solution B was 0.201. The ratio of atoms of $Ca^{2+}$ in solution A to total moles of phosphate ($PO_4$) in solution B was 1.34, corresponding to use of 0.75 mole of $PO_4$ per mole of $CalCl_2$.

Example 2

This preparation was carried out in a cylindrical stainless steel vessel of approximately 250 liters capacity equipped with a large, slowly rotating propeller-type stirrer and a surrounding water jacket used to maintain the reaction mixture at 45° C. The vessel was initially charged with a solution of 5 lbs. of NaCl, 125 g. of $Na_2HPO_4 \cdot 7H_2O$ and 10 g. of $NaH_2PO_4 \cdot H_2O$ in 80 lbs. of water. The solution had a pH of 6.99 and by analysis a total $PO_4$ content of 0.015 M. Assuming a specific gravity of 1.04, the solution was 1.045 M in NaCl. Calcium-deficient hydroxylapatite, about 225 grams, from previous preparations was added to serve as seed crystals.

Solutions A and B were prepared as follows:

Solution A: 39 lbs. reagent-grade $CaCl_2 \cdot 2H_2O$ in 202 lbs. of water. By analysis this solution was 1.23 M in $CaCl_2$.

Solution B: 66 lbs. reagent-grade $Na_3PO_4 \cdot 12H_2O$ and 700 ml. of 85% $H_3PO_4$ in 166 lbs. of water. By analysis this solution was 0.940 M in phosphate ($PO_4$) with a ratio of moles of $HPO_4^{2-}$ to moles of $PO_4^{3-}$ of 0.174 as determined by titration. The solution had a pH of 11 and a measured desnsity at 25° C. of 1.1489 g./cc.

Over a one-hour period, 86.7 liters of Solution A and 89.4 liters of Solution B were added at 45° C. with slow stirring to slurry C already in the reactor. (Quantities added corresponded to a Ca/PO$_4$ ratio of $$\frac{86.7 \times 1.23}{89.4 \times 0.94} = 1.27.)$$

The final pH of the slurry was 7.15, and it was 0.026 M in dissolved PO$_4$.

The precipitate settled rapidly and was washed 10 times with water by decantation and found to have a Ca/PO$_4$ molar ratio of 1.472 by analysis, and an X-ray diffraction pattern indicating that the novel hydroxylapatite-related material was the only crystalline phase.

Assuming additive volumes and complete reaction of CaCl$_2$, the molarity of NaCl formed by reaction was $$\frac{86.7 \times 1.23 \times 2}{86.7 + 89.4} = 1.21 \text{ M}$$

Example 3

The reactor and accessory equipment duplicated that used in Example 2. The reactor was initially charged with 80 lbs. of water, 5 lbs. of NaCl, 80 g. of Na$_2$HPO$_4$·7H$_2$O, and 20 g. of NaH$_2$PO$_4$·H$_2$O. The pH was 6.53. Phosphate (PO$_4$, present as HPO$_4^{2-}$ and H$_2$PO$_4^-$), as determined by analysis, was 0.009 M, and NaCl concentration, assuming a solution density of 1.04 g./cc. was 1.045 M. Calcium-deficient hydroxylapatite (225 g.) from a previous preparation was then added to the solution to act as seed during the subsequent precipitation.

Solution A was prepared by dissolving 31 lbs. of reagent-grade CaCl$_2$·2H$_2$O in 189 lbs. of water. This solution was 1.034 M in CaCl$_2$ by analysis.

Solution B was prepared by dissolving 54 lbs. of reagent-grade Na$_3$PO$_4$·12H$_2$O and 420 ml. of 85% by weight H$_3$PO$_4$ in 171 lbs. of water. The solution was found by analysis to be 0.801 M in total PO$_4$ with an HPO$_4^{2-}$ to PO$_4^{3-}$ molar ratio of 0.227.

Over a 70-minute period, 87.3 liters of Solution A and 86.6 liters of Solution B were added at 45° C. to slurry C originally placed in the reactor. The pH after addition of Solutions A and B was 6.65 and total PO$_4$ concentration in solution by analysis was 0.009 M. The precipitate gave an X-ray diffraction pattern indicative of the novel hydroxyl-apatite-related material as the only crystalline phase. On the assumption that all the CaCl$_2$ entered into NaCl formation and that volume on mixing Solutions A and B was strictly additive, the NaCl molarity attained by mixing the 2 solutions is calculated to be $$\frac{87.3 \times 1.034 \times 2}{87.3 + 86.6} = 1.037 \text{ M}$$

This is very close to the 1.045 M NaCl calculated to have been present in the original solution in the reactor. Total PO$_4$ concentration in solution before and after precipitation was 0.009 M. The pH was 6.53 before precipitation and 6.65 after precipitation. Since Solutions A and B were added at as nearly the same rate as possible, it is obvious that precipitation was carried out under essentially constant environment conditions at essentially constant ionic strength. The ratio of total gram atoms of Ca$^{2+}$ to total moles of PO$_4$ used was $$\frac{87.3 \times 1.034}{86.6 \times 0.801} = 1.30.$$

For convenience, the quantities of reactants employed and the strengths of the several solutions are summarized in Table III.

TABLE III.—SUMMARY OF EXAMPLES

| Example number | Solution A | | Solution B | | | | | | | Product slurry | | | | |
|---|---|---|---|---|---|---|---|---|---|---|---|---|---|---|
| | Molarity of CaCl$_2$ used | Total moles of CaCl$_2$ used | PO$_4$ content | | Total moles used | Phosphate ratio, HPO$_4^{-2}$:PO$_4^{3-}$ | pH | Molarity of NaCl therein | pH | Molarity in total PO$_4$ | Phosphates used in buffering | pH | Ca/PO$_4$ ratio in product | Ca/PO$_4$ ratio in reactants used | NaCl molarity [b] | Measured PO$_4$ molarity in liquid phase |
| | | | M | | | | | | | | | | | | | |
| 1 | 1.36 | 0.1088 | 1.014 | 0.08112 | | ~0.201 | ~11 | 1.44 | ~7.0 | 0.02 | NaH$_2$PO$_4$·H$_2$O and K$_2$HPO$_4$ | 6.7 | 1.495 | 1.34 | 1.36 | 0.011 |
| 2 | 1.23 | 106.64 | 0.94 | 84.03 | | 0.174 | ~11 | 1.045 | 6.99 | 0.015 | Na$_2$HPO$_4$·7H$_2$O and NaH$_2$PO$_4$·H$_2$O | 7.15 | 1.472 | 1.27 | 1.21 | 0.026 |
| 3 | 1.034 | 90.27 | 0.801 | 69.37 | | 0.227 | ~11 | 1.045 | 6.53 | 0.009 | ....do.... | 6.65 | (d) | 1.30 | 1.037 | 0.009 |

[a] "Calcium phosphate" with a Ca/PO$_4$ ratio of 1.45-1.50 prepared in a previous run; added as a wet, undried crystalline mass.
[b] On assumption of additive volumes upon mixing reactants and complete conversion of CaCl$_2$ to NaCl.
[c] Calculated from molarity of HPO$_4^{2-}$ and PO$_4^{2-}$ in solution used.
[d] Not available.

UTILITY

Example A

Percolation characteristics.—The highly important ability of the novel calcium-deficient hydroxylapatite of this invention to permit liquids to flow through it in chromatography columns was established by packing a 32 mm. I.D. column firmly with a 5 cm. layer of the phosphate and then measuring the rate of flow of convention 0.005 M phosphate buffer, pH~7, through the layer at 25° C. under 20 cm. liquid head pressure. The product of Example 3 permitted a flow rate of 2.5 ml./min. Products of the invention typically gave flow rates of 1.5–3.5 ml./min. In contrast, under identical conditions, a sample of Bio-Gel HT® designated as a "Tiselius-method hydroxylapatite" and sold by the Bio-Rad Laboratories, permitted a flow of 0.3 ml./min.

Example B

Adsorption properties.—The ability of the products of this invention to adsorb proteins was evaluated by measurements of the removal of a protein, ovalbumin, from solution in neutral aqueous phosphate buffer. Since the calcium-deficient hydroxylapatite was normally stored wet at 5° C., water content was first reduced by centrifuging at low speed, thereby given an aqueous supernatant which was discarded and a dense cake of calcium phosphate with a water content of approximately 50% by weight. Meantime a 1 mg./ml. solution of ovalbumin in a buffer that was 0.012 M in $NaH_2PO_4$ and 0.018 M in $Na_2HPO_4$ was prepared. Six grams of the centrifuge cake were stirred with 10 ml. of the ovalbumin solution at 0° C. for a few minutes, and the resulting slurry was centrifuged, and the clear supernatant was assayed for protein. This solution typically had a pH of 7 and a total phosphate ($PO_4$) concentration of 0.01 M. The results were expressed as:

$$\frac{\text{mg./ml. of protein in the supernatant}}{\text{mg. of protein adsorbed per gram of calcium-deficient hydroxylapatite}}$$

The calcium phosphate produced in Example 3 gave a value of 0.04, that is to say, a solution having a protein concentration of 0.04 mg./ml. is in equilibrium at about 0° C. with calcium-deficient hydroxylapatite having 1 mg. of protein adsorbed on 1 gram of the hydroxylapatite. Typical products of the invention made by the novel process give values of 0.02–0.10 and are from 20 to 100 times as effective in adsorbing proteins as materials precipitated under other conditions.

Even small departures from the process of this invention produce different products as evidenced by too-high adsorption values. For example, product made substantially as taught herein except that the temperature was maintained at 25° C. (below the 35° C. to 55° C. range taught herein), and Solution B comprised mainly $Na_2HPO_4$ (rather than mainly $Na_3PO_4$), gave an adsorption value of 1.9. A material made substantially as taught except that the temperature was kept at 25° C. and the pH varied between 7.9 to 11 (above the 5.5 to 7.5 range taught herein), gave an adsorption value of 3.3. Such high values indicated products that are of little use in adsorbing and purifying proteins.

I claim:

1. A granular, calcium-deficient, hydroxylapatite-related composition characterized by a $Ca/PO_4$ formula weight ratio of about 1.45±0.05 and an X-ray powder diffraction pattern wherein diffraction peaks arising from ($hkl$) planes are sharp when $h$ and $k$ are zero and broadened when $l$ is small compared to $h$ and $k$, essentially as shown in FIG. 5, said diffraction pattern being free of diffraction peaks due to $CaHPO_4 \cdot 2H_2O$.

2. A composition according to claim 1, further characterized by
   a capability of adsorbing, at about 0° C., ovalbumin from a neutral, dilute phosphate buffer solution to the extent that the solution in equilibrium with one milligram of adsorbed ovalbumin per gram of the hydroxylapatite-related composition contains 0.02–0.1 mg. of ovalbumin per ml. of 0.01 M phosphate solution, and
   a capability of permitting a flow, at about 25° C., of 1 to 3.5 ml./min. of 0.005 M phosphate buffer solution under 200 mm. head pressure through at 32 mm. diameter bed of the hydroxylapatite-related composition packed in a column to a depth of 50 mm.

3. A process for preparing the composition of claim 1, comprising contacting a feed stream (A) of a calcium salt selected from at least one member of the group consisting of calcium chloride, calcium nitrate and calcium acetate with a feed stream (B) of a mixture of secondary and tertiary orthophosphate salts the metal cations of which are selected from at least one of the group consisting of sodium, potassium and ammonium, at a pH of between about 5.5 to 7.5 and at temperatures between about 35° to 55° C., under aqueous conditions and substantially constant environment conditions, wherein the formula weight ratio of the Ca in feed stream (A) to the $PO_4$ in feed stream (B) is maintained between about 1.20 to 1.44, and wherein the ratio of moles of secondary phosphate to moles of tertiary phosphate, $HPO_4^{2-}/PO_4^{3-}$, in stream (B) is maintained between about 0.06 to 0.38, and wherein the formula weight ratio of $Ca/PO_4$ plus (¾)·(secondary phosphate/tertiary phosphate) is maintained between about 1.35 to 1.60.

4. A process according to claim 3, wherein the pH is maintained between about 6 to 7 and the temperature is maintained between about 40° to 50° C.

5. A process according to claim 3, wherein the formula weight ratio of the Ca in feed stream (A) to the $PO_4$ in feed stream (B) is maintained between about 1.24 to 1.40, and wherein the ratio of moles of secondary phosphate to moles of tertiary phosphate, $HPO_4^{2-}/PO_4^{3-}$, in stream (B) is maintained between about 0.10 to 0.34, and wherein the formula weight ratio of $Ca/PO_4$ plus (¾)·(secondary phosphate/tertiary phosphate) is maintained between about 1.40 to 1.55.

6. A process according to claim 5, wherein feed streams (A) and (B) are added to an aqueous solution or slurry (C) containing the salt(s) formed by the calcium salt anion(s) and the phosphate salt cation(s) at a molarity approximately numerically equal to that of the calcium in feed stream (A), said solution or slurry (C) having a pH of between about 5.5 to 7.5 and a temperature between about 35° to 55° C.

7. A process according to claim 6, wherein the aqueous slurry (C) contains seed crystals of hydroxylapatite-related calcium phosphate.

8. A process for preparing the composition of claim 1, comprising contacting a feed stream (A) of a calcium salt selected from at least one member of the group consisting of calcium chloride, calcium nitrate and calcium acetate with a feed stream (B) of a mixture of secondary and tertiary orthophosphate salts the metal cations of which are selected from at least one of the group consisting of sodium, potassium and ammonium, at a pH of between about 6 to 7 and at temperatures between about 40° to 50° C., under substantially constant environment conditions, wherein the ratio of Ca in stream (A) to $PO_4$ in stream (B) is between about 1.24 to 1.40, and the ratio of secondary phosphate/tertiary phosphate in feed stream (B) is between about 0.10 to 0.34, and the formula weight ratio of $Ca/PO_4$ plus (¾)·(secondary phosphate/tertiary phosphate) is between about 1.40 to 1.55.

9. A process according to claim 8, wherein the calcium salt in feed stream (A) is calcium chloride and the secondary and tertiary orthophosphate salts in feed stream (B) are disodium hydrogen phosphate and trisodium phosphate, respectively.

References Cited

UNITED STATES PATENTS

| | | | |
|---|---|---|---|
| 2,946,656 | 7/1960 | Schreurs | 23—109 |
| 3,505,012 | 4/1970 | Dale et al. | 23—109 |
| 3,509,070 | 4/1970 | Lapidus | 252—437 |
| 3,197,374 | 7/1965 | Hennessen et al. | 167—78 |
| 3,027,229 | 3/1962 | Towey et al. | 23—109 |

OSCAR R. VERTIZ, Primary Examiner

G. A. HELLER, Assistant Examiner

U.S. Cl. X.R.

260—112